United States Patent
Breslow et al.

[15] 3,684,801
[45] Aug. 15, 1972

[54] REMOTE OXIDATION OF UNACTIVATED STEROID METHYLENE GROUPS

[72] Inventors: Ronald Breslow, 275 Broad Ave., Englewood, N.J. 07631; Steven Baldwin, 542 W. 112th St., Apt. 6N, Steven, N.Y. 10025; Michell Winnik, 1149 N. Chicago St., Los Angeles, Calif. 90033

[22] Filed: May 18, 1970

[21] Appl. No.: 38,486

[52] U.S. Cl. .......260/239.57, 260/397.2, 260/397.4, 260/397.5
[51] Int. Cl. ............................................C07c 173/00
[58] Field of Search............260/239.57, 397.2, 397.4

Primary Examiner—Elbert L. Roberts
Attorney—Cifelli and Behr

[57] ABSTRACT

There is provided a method of activating inactive methylene groups of the 5α-steroid nucleus. This method comprises forming a 3α-m- or p-benzoylphenyl 5α-steroid alkanoate and irradiating said ester in ultraviolet light in the presence of a solvent. Upon saponification of the ester there is produced directly or after an oxidation step performed prior to saponification, a steroid corresponding to the starting steroid additionally possessing a reactive group located at position 12, 14 or 16 of the steroid nucleus, the location depending on the number of carbons in the original alkanoyl moiety.

25 Claims, No Drawings

REMOTE OXIDATION OF UNACTIVATED STEROID METHYLENE GROUPS

DESCRIPTION OF THE PRIOR ART

Readily available steroids usually possess an oxygen function at C-3. An oxygen function may often be inserted at C-17 by degradative oxidation of, say, a cholestane side chain. Many physiologically active steroids possess functional groups such as oxygen, halo, or a double bond at positions 11, 9, 14, 16 or 17. Of these the most important are the 11-hydroxy and the 17-hydroxy groups, methods being known in the art to derive most of the others therefrom, albeit often via many steps.

Heretofore the most widely accepted methods of functionalizing a steroid molecule have been by microbiological oxidation. While these methods have met with industrial acceptance, they require enormous plant and very strict control of reaction conditions to obtain optimal metabolization of the substrate by the micro-organism.

No simple general method has heretofore been available for functionalizing a 5α-steroid in acceptable yields in the inactive positions by simple chemical means.

SUMMARY OF THE INVENTION

In the process of the present invention there is formed a 3α-m- or p-benzoyl phenyl 5α-steroid alkanoate from the corresponding 3α-hydroxy-5α-steroid. The ester is formed by conventional means and is then irradiated such an ultraviolet source into solvent. The actual products obtained will depend upon the solvent used, the number of carbon atoms in the alkanoyl moiety, and whether the benzoyl substituent on the phenyl nucleus is m- or p- to the alkanoyl moiety. The product obtained after removal of the ester group, if necessary after an intermediate oxidation step is an oxo-5α-steroid or an unsaturated 5α-steroid. Where a halogenated solvent is employed, halo substitution on the steroid nucleus will also occur. The process is operative with any 3α- hydroxy 5α-steroid, including those of the cholestane, androstane and pregnane series.

There are obtained by this process 12-halo and 12-oxo-5α-steroids, $\Delta^{14}$, $\Delta^{8(14)}$ and $\Delta^{16}$ - 5α steroids.

The 12-halo steroids may be dehydrohalogenated and the 12-oxo-steroids may be reduced and dehydrated to form the $\Delta^{11}$ steroid, an intermediate for the desired 11-oxo-steroid, or it may if desired, be rearranged to form the highly desired $\Delta^{9(11)}$ steroid which is a valuable intermediate for the formation of either 11-hydroxy or 11-hydroxy-9α-fluoro steroids which in the 3, 17-dihydroxy-20-oxo-5α pregnane series, are valuable anti-inflamatory agents and intermediates for other members of this series of compounds, which heretofore could only be obtained by a microbiological oxidation route.

The formation of $\Delta^{14}$ - 5α steroids provides a valuable route to 14-hydroxy steroids such as the cardenolides.

The provision of the $\Delta^{16}$ function provides a novel and simple means of either introducing the 17-hydroxy group which is required in many anti-inflamatory steroids of the pregnane series, and also is a means of introducing a 16-methyl group which is required in the synthesis of the valuable anti-inflamatory agents dexamethasone and betamethasone.

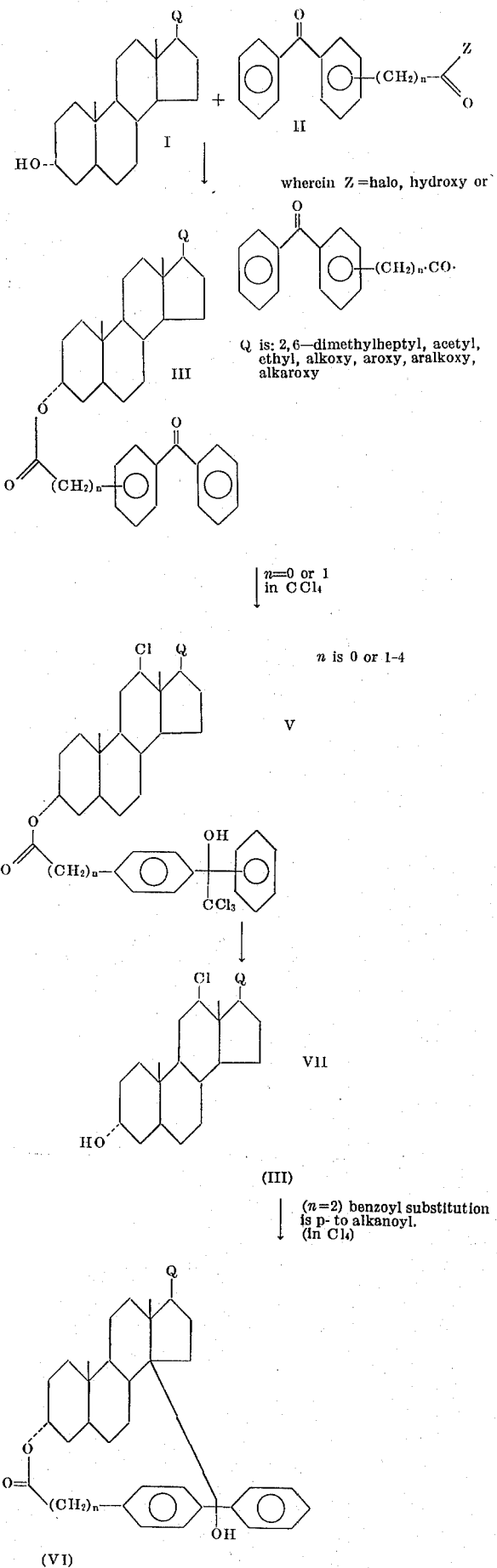

CHART A wherein Z = halo, hydroxy or

Q is: 2,6—dimethylheptyl, acetyl, ethyl, alkoxy, aroxy, aralkoxy, alkaroxy n = 0 or 1 in $CCl_4$ n is 0 or 1-4

(n=2) benzoyl substitution is p- to alkanoyl. (in $CI_4$)

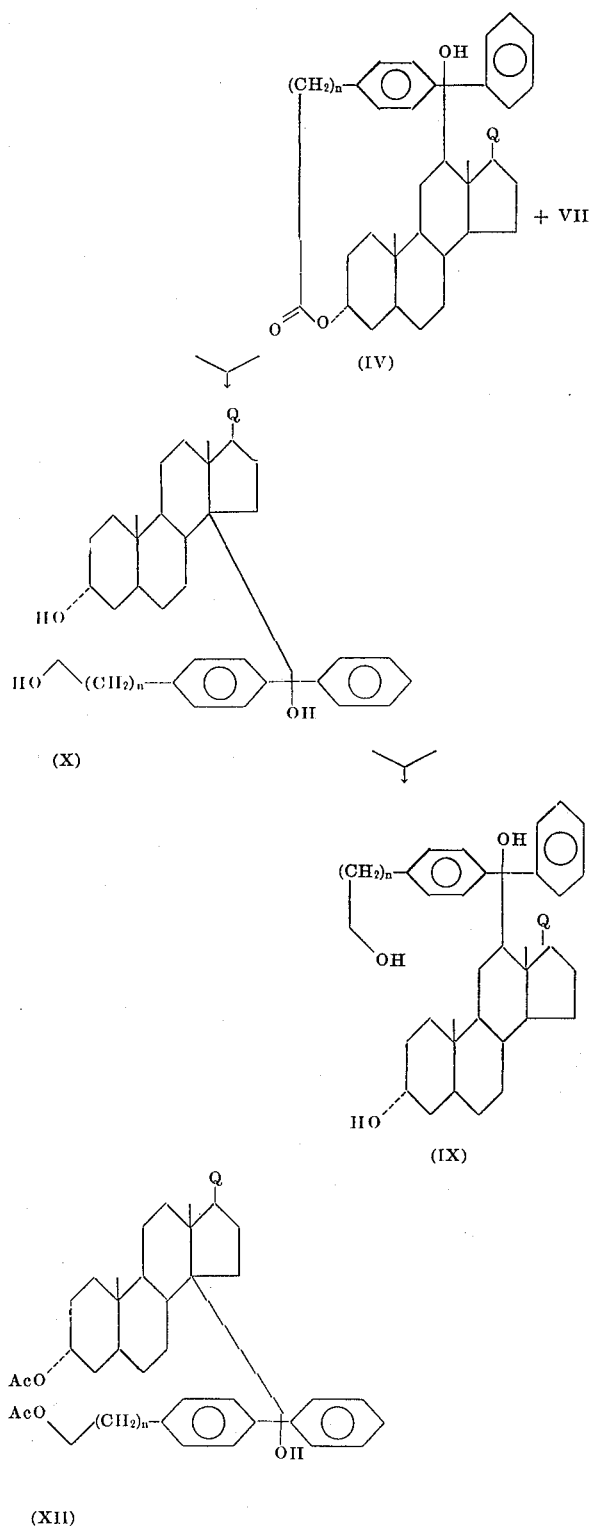
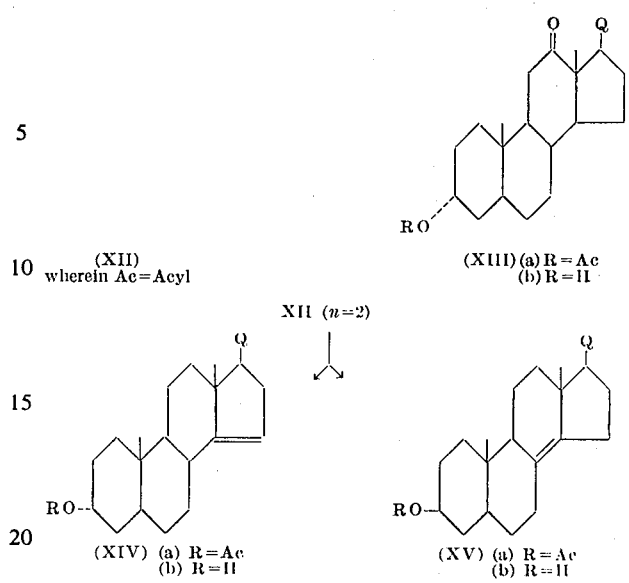
(XII) wherein Ac=Acyl
XII (n=2)
CHART B
(III) (N=2)
in benzene or acetonitrile
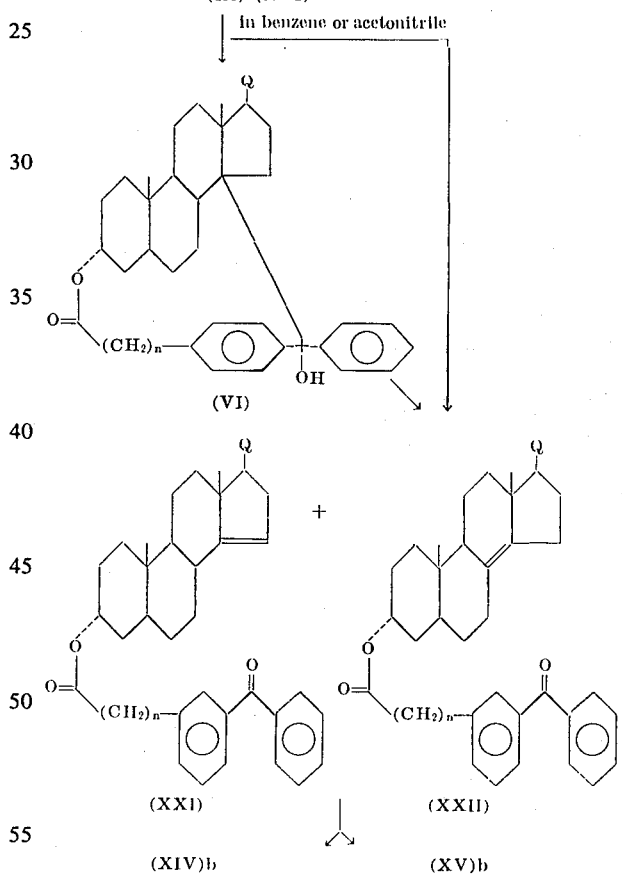
CHART C
III (n=4), benzoyl substitution is p- to alkanoyl (in benzene or acetonitrile)
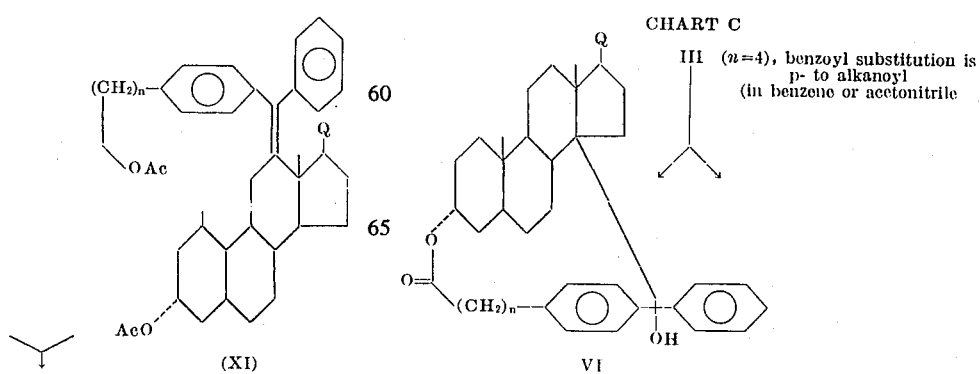

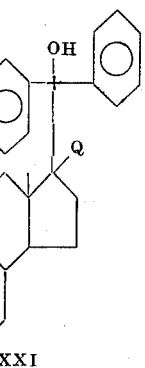

XXXI

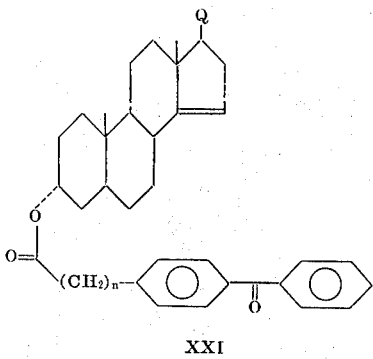

XXI

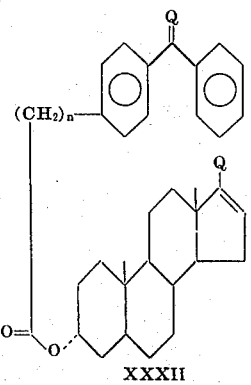

XXXII

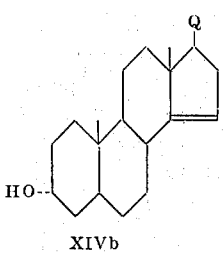

XIVb

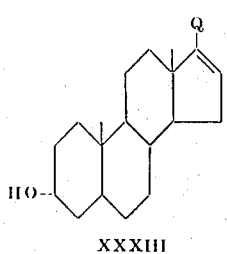

XXXIII

DESCRIPTION OF THE PREFERRED EMBODIMENTS

In the process of the present invention the steroid to be functionalized, suitably 3α-hydroxy-5α-cholestane; 3α-hydroxy-5α-pregnane; 3α-hydroxy-5α-androstan-12-yl ether or the like is converted into the corresponding 3α-benzoylphenyl-5α-steroid alkanoate. The esterification may be carried out by conventional means, thus the corresponding benzoylphenyl alkanoyl halide or anhydride is reacted with the 3αhydroxy steroid, preferably there is utilized an excess of the benzoylphenyl alkanoyl halide in pyridine. The reaction is worked up in the conventional manner and isolated to give the corresponding ester. The alkanoyl moiety referred to herein may contain one to four carbon atoms. The exact number being chosen with reference to the position on the molecule which is desired to activate.

The ester is than taken up in a solvent. There may be used any conventional irradiation solvent. However, for strict product control it is preferred to utilize carbon tetrachloride or methylenechloride where halogenation is required or the 12-oxo group is desired, and acetone, acetonitrile or benzene, in other cases where halogenation is not required. Certain solvent preferences will become apparent herein below.

The concentration of ester in a solvent is not critical. A low concentration would be unsound from the point of view of productivity and a high concentration would not permit proper irradiation of the entire solution. It has been found convenient to utilize solutions in the range of $5 \times 10^{-3}M$ to $5 \times 10^{-4}M$. However, the use of higher concentrations is within the purview of the invention.

Irradiation is carried out using any conventional irradiation cell equipped with a source of ultra violet light, a medium pressure mercury lamp has been found especially suitable.

The irradiation is carried out at between —40° and +60°, suitably 10° to 30°C for from about 1 to about 5 hours, preferably for about 2 to 3 hours.

The course of the reaction may be illustrated as follows:

The formation of ester (III) from a 3-α-hydroxy-5α-steroid (I) and the corresponding anhydride or acyl halide (II) is carried out by conventional means. The ring substitution of the alkanoyl group where $n=0$ or 1–4 is at a position meta or para to the carbonyl group attached to said ring.

The para-substituted compound is generally prepared. The preferred method comprises a Friedel-Crafts condensation of the appropriate methyl phenylalkanoate with benzoyl chloride in the presence of aluminum chloride according to the method of Borsche and Sinn (Ann. 553 260, (1942)).

Chart A illustrates the activation of the 12 position.

In Compound (III), $n$ is 1 where the substitution is m- (i.e., meta), and $n=0$ or 2 where the substitution is p-. A solution of (III) suitably a solution of between $5 \times 10^{-4}M$ and $5 \times 10^{-3}M$ is prepared in dry carbon tetrachloride. The mixture is irradiated with, say, a 450W medium pressure mercury vapor for from about 2 to about 5 hours at vessel temperature of from about 15° to about 60° C. Upon completion of irradiation the solvent is removed. Where $n=0$ or 1 the residue comprises a compound presumed to have the structure (VII). The residue is treated with a dilute solution of a strong base; suitably the residue is taken up on a lower alkanol and an aqueous solution, say a 5–15 percent w/w solution of an alkali metal hydroxide is added thereto, potassium hydroxide being preferred. The mixture is diluted with water and extracted. Evaporation of the extract yields a residue which is then purified by chromatography. A neutral alumina has been found suitable. The 12-chloro-5α-steroid ester is cleaved by the dilute base to give the desired 3α-hydroxy-12-chloro-5α-steroid (VII) which is eluted from the column by use of high polarity solvents such as ether, methanol or mixtures thereof. Where n=2 there the residue from the irradiation step comprises a mixture of the 12-substituted lactone (IV), the 14-substituted lactone (VI) and the 12-halo compound (VII). The residue is treated with dilute alkali as above and chromatographed.

Elution with moderately polar solvents such as benzene or petroleum ether/ether yields a mixture of compounds (IV) and (VI). The 12-halo compound (VII) is isolated by elution with high polarity solvents as before. No separation of (IV) and (VI) is carried in this stage.

The ester groups of the lactones (IV and VI) are then cleaved. While such cleavage could be carried out by conventional methods of base hydrolysis, it is preferred to utilize reductive methods. The lactones (IV and VI) are taken up in benzene or an ethereal solvent and then reduced with an excess of lithium aluminum hydride. The reaction is quenched with water or dilute aqueous sodium hydroxide and the resultant triols (IX and X) are acylated at the primary and secondary hydroxy positions. The acylation is suitably carried out by acylation with acetic anhydride in pyridine. The diacyl derivatives are then treated with a dehydrating agent. There may be employed as dehydrating agents, iodine-acetic acid, phosphoryl chloride-pyridine, especially preferred, however, is thionyl chloride in pyridine. It is preferred to use from about 1 to about 5, and suitably about 2 mols of thionyl chloride per mole of diacyl-(IX). The reactants are cooled in pyridine at from −15° C to about 0° C, suitably at about −10° C, suitably for about 0.5 hours. The reaction mixture is quenched with water and extracted with a water immiscible solvent such as ether to yield the diphenyl ethylene derivative (XI) and the unchanged diacyl derivative of X. (XII)

The ethylene bond in compound (XI) is then oxydized to give the corresponding 12-oxo compound. It would be expected that such oxidation would be most conveniently carried out by ozonolysis, ozonolysis however fails. The oxidation is readily carried out with ruthenium tetroxide together with sodium periodate by the method of Stork et al (J.Amer.Chem. Soc 85 3419 (1963)). The resultant mixture contains the 3α-acyl-12-oxo compound (XIIIa) and the corresponding unchanged diacyl derivative (XII). These are separated by chromatography on alumina.

Compound (XIIIa) is subjected to base hydrolysis, suitably by an alkali in an alkanol, such as sodium hydroxide in methanol; to yield, upon work up the desired 3α-hydroxy-12-oxo-5α steroid (XIIIa). The 14-substituted compound (XII) is converted to the corresponding $\Delta^{14}$ and $\Delta^{8(14)}$ compounds (XIVa) and (XVa) by other oxidizing agents. Among the suitable oxidizing agents for the purpose may be mentioned chromium trioxide. Especially preferred, however, is lead tetraacetate. In this embodiment the reaction product is taken up in a suitable solvent such as cyclohexane or benzene, preferably benzene in the presence of a mild base, suitably solid calcium carbonate and treated with an excess of lead tetraacetate, it is preferred to use between 1 and 2 moles, suitably 1.25 moles of oxidant per mole of reaction product. The mixture is then heated from about 6 to about 18 hours, suitably for about 10 hours at about 80° C.

The reaction mixture is then worked up. In the preferred procedure, the reaction is quenched with water and extracted with a water immiscible solvent such as benzene, to yield, upon evaporation a mixture of the 3-acylates (XIVa and XVa). The acylates are then saponified in the usual manner to yield the corresponding 3α-hydroxy $\Delta^{14}$-and $\Delta^{18(14)}$-5α steroids (XIVb and XVb). The $\Delta^{14}$ and $\Delta^{8(14)}$ compounds are the major products of this reaction sequence being present in the ratio of 2:1 relative to the 12-oxo compound. This is not the preferred route to these compounds.

Where it is desired to form a $\Delta^{14}$-5α steroid (the corresponding $\Delta^{8(14)}$-5α-steroid being formed in the same process) the preferred reaction proceeds in accordance with Chart B.

The starting material utilized is compound (III) wherein n=2 and the alkanoyl substitution is p- to the ketone carbonyl. In place of using carbon tetrachloride as a solvent there is utilized acetone, benzene or acetonitrile. The use of these solvents ensures the absence of attack of C-12. The irradiation step is carried out as above.

The irradiation product is isolated by evaporation of the solvent and if desired may be chromatographed to separate the $\Delta^{14}$ ester (XXI) from the lactone (XI). The discovery that the $\Delta^{14}$ ester (XXI) is formed as a direct photolysis product is most surprising and quite unexpected even in view of the foregoing discoveries in the process of the present invention.

In the preferred modification however, the entire reaction product is subjected to oxidative cleavage in the same manner as set forth above for the treatment of compound (XII) to yield, upon work up, a mixture of (XXI) and (XXII,) which, upon alkaline hydrolysis in the usual manner yield the desired 3α-hydroxy $\Delta^{14}$- and $\Delta^{8}$(14a)-5α steroids (XIVb) and (XVb).

In accordance with the precedures of Chart B described above but starting with an ester (III) when n is 4 and the alkanoyl substitution is p- to the carbonyl, there is obtained principally the corresponding $\Delta^{16}$ compound (XXXIII). In this process the ester (III) is irradiated in acetonitrile or benzene in the manner described above to give a mixture comprising principally of the $\Delta^{16}$ ester (XXXII), the $\Delta^{14}$ ester (XXI) and small amounts of lactones (XX) and (XXXI). The entire reaction mixture is treated in the previously described manner, with lead tetraacetate followed by base hydrolysis to yield the $\Delta^{16}$-and $\Delta^{14}$-5α steroids (XXXIII) and (XIVb) respectively.

As shown in the foregoing flow charts the reactions may be carried out in the 5α-cholestane series (Q is 2,6-dimethylheptyl), the 5α-pregnane series (Q is ethyl), the 20-keto-5α-pregnane series (Q is acetyl), and the 5α androstane series (Q is an ether group,) and the like. In androstane series Q is alkoxy suitably alkoxy of, say one to five carbon atoms, aroxy, such as phenoxy, aralkoxy of one to five carbons in the side chain such as benzoxy, and phenethoxy or alkaroxy such as toloxy, xyloxy and the like.

While only the foregoing series have been exemplified, all steroids having unactivated methylenes at positions 12, 14 and 16 are within the purview of this invention.

Compound XI (where Q is 2,6-dimethylheptyl), i.e., 12-keto-3α-cholestanol, can be converted to 11-dehydrocorticosterone (LI (Kendall's Compound A)) by the following sequence. Compound XI is heated with an excess of dihydropyran for a few hours, for instance with 10 equivalents of dihydropyran at 100° for three hours, in the presence of a catalytic amount, for example 5 mole percent, of acidic catalyst, for example p-toluenesulfonic acid. Work up in the standard manner produces the 3-tetrahydropyranyl ether of XI, i.e.., compound XLI. This is warmed to 70° C with 1.2 equivalents of p-toluenesulfonylhydrazide in 20 parts by weight of ethanol containing one percent by weight of acetic acid, to afford after the usual work up the p-toluenesulfonylhydrazone (XLII). This is dissolved with warming in 20 parts by weight of dioxane, two parts by weight of potassium t-butoxide are added, and the mixture is heated at reflux for 4 hours. The product, after the usual work up, is the tetrahydropyranyl ether (XLIII) of Δ11 3α-cholestenol. This may be converted to 3,11-diketocholestane (XLVI), by a procedure analogous to that used by Reichstein (A.Lardon and T.Reichstein, Helv.Chim.Acta, 26, 747 (1943)) as modified by Sarett (L.H.Sarett, J. Biol.Chem., 162, 601 (1946) in the synthesis of 11-dehydrocorticosterone. Thus with hypobromic acid and a trace of sulfuric acid, (XLIII) is converted to the bromohydrin XLIV, which with chromic acid is oxidized to the bromodiketone(XLV.) With zinc in acetic acid this is converted to 3,11-diketocholestane (XLVI), and this on heating with 20 equivalents of 10 percent $CrO_3$ in acetic acid at 100° for 3 hours affords the diketo acid(XLVII.) This is hydrogenated over Pt to produce the 3 β-ol(XLVIII) by a procedure analogous to that of Reichstein, (Supra) and the side chain at C-17 is then converted to the acetoxy-acetyl side chain in(XLIX)by the standard Mystre Miescher degradation (Ch.Mystre and A.Wettstein,Helv.Chim.Acta, 30, 1236 (1947) and earlier work), during which the 3-keto group is reformed. Finally, treatment with 1 equivalent of bromine in acetic acid for 30 min at 50°, followed by standard work up affords the 2-bromo derivative (L) which on heating in 50 parts by weight of dimethylformamide solution with 10 parts by weight of lithium chloride for 2 hours at 70°–80°, followed by the standard work up, affords dehydrocorticosterone (LI)

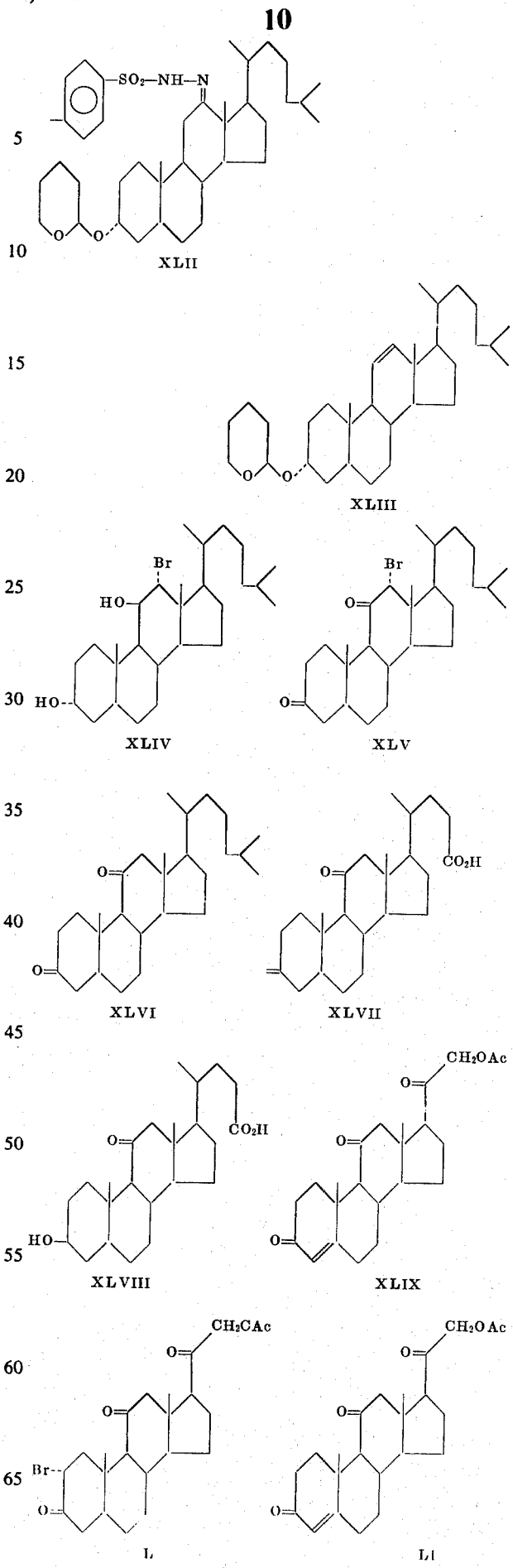

Compound (VII) (where Q is 2,6-dimethylheptyl) i.e. 12-chloro-3α-cholestanol, may also be converted to intermediate(XLIII) by conversion of(VII)to the tetrahydropyranyl ether (LII), as described previously for the conversion of(XIII) to (XLI.) Heating of(LII) in 10 parts by weight of dimethylsulfoxide with 3 equivalents of potassium t-butoxide for 3 hrs. at 70°, followed by the standard work up affords(XLIII).

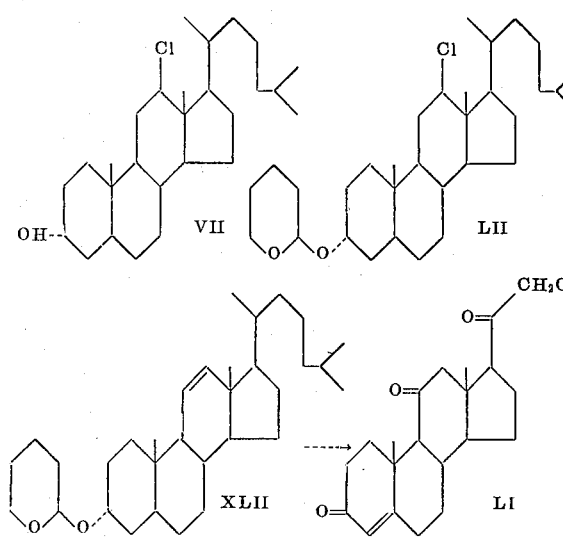

Compound(XIVb), $\Delta^{14}$-3α-cholestanol, can be converted to the well-known active cardiac stimulant digitoxigenin (LXVII) by the following procedure. The compound is taken up in ten parts by weight of methylene chloride, one equivalent of m-chloroperbenzoic acid is added and the solution is allowed to stand for 2 hrs. at 30°. Standard work up yields the β-epoxide (LXI,) which on treatment with two equivalents of lithium aluminum hydride in ten parts by weight of diethyl ether for 1 hr at 20°–30°, followed by the standard work up, affords the 3α-14β-cholestandiol (LXII). This is taken up in ten parts by weight of pyridine, containing one part by weight of chromium trioxide, and the reaction mixture, after standing for 30–60 min. at 20°–30°, may be worked up in the standard way to afford 3-keto-14β-hydroxycholestane (LXIII). This compound may be converted to the enone (LXIV) by treatment in a manner analogous to that described above for the conversion of(XLIX) to (LI.) This is hydrogenated as a 10 percent solution in acetic acid with 1 percent by weight of PtO$_2$ at 1 atmosphere and 20°–30° until two equivalents of hydrogen are absorbed, and worked up in the standard fashion to afford 3β, 14β-coprostanediol(LXV). With dihydropyran, as described above for the conversion of (XI) to (XLI,) this may be converted to the tetrahydropyranyl ether at C-3, and this may be converted to (LXVI) by a sequence analogous to that used in the conversion of (XLVI) to (XLIX.) Finally, this may be converted to digitoxigenin (LXVII) by a sequence analogous to that reported by Sondheimer (N.Danieli, Y.Mazur, and F.Sondheimer,J.Am. Chem.Soc., 84, 875 (1962)), in which (LXVII)is treated with lithium ethoxyacetylide, followed by an acidic work up.

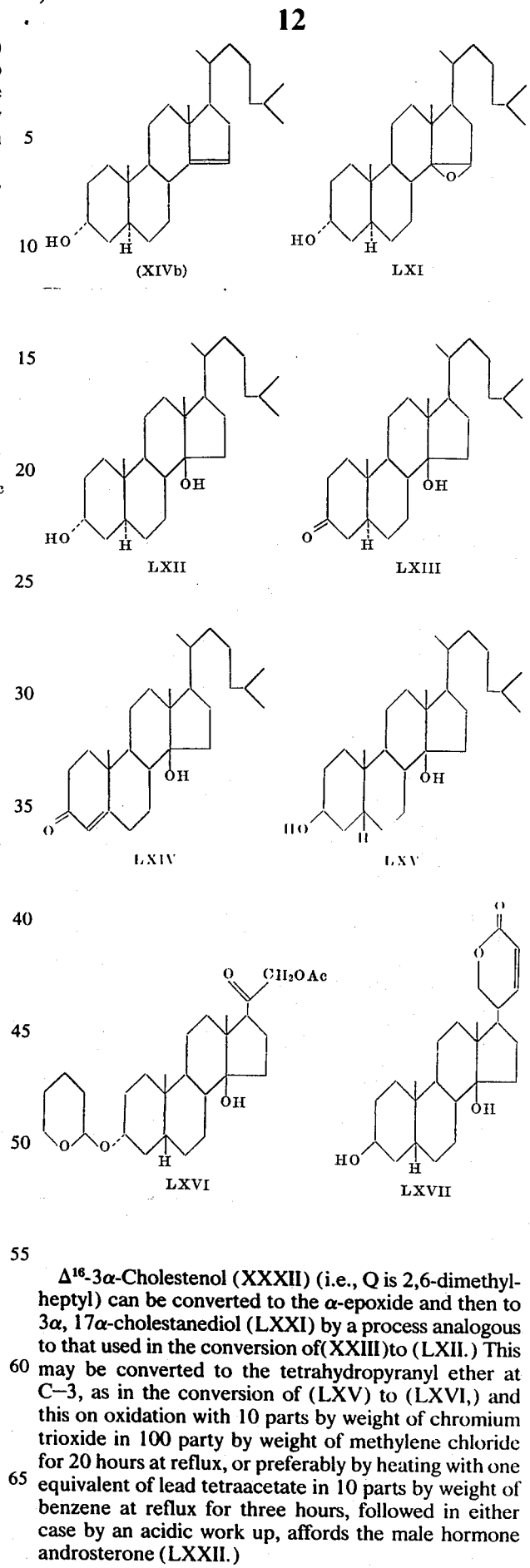

$\Delta^{16}$-3α-Cholestenol (XXXII) (i.e., Q is 2,6-dimethylheptyl) can be converted to the α-epoxide and then to 3α, 17α-cholestanediol (LXXI) by a process analogous to that used in the conversion of(XXIII)to (LXII.) This may be converted to the tetrahydropyranyl ether at C-3, as in the conversion of (LXV) to (LXVI,) and this on oxidation with 10 parts by weight of chromium trioxide in 100 party by weight of methylene chloride for 20 hours at reflux, or preferably by heating with one equivalent of lead tetraacetate in 10 parts by weight of benzene at reflux for three hours, followed in either case by an acidic work up, affords the male hormone androsterone (LXXII.)

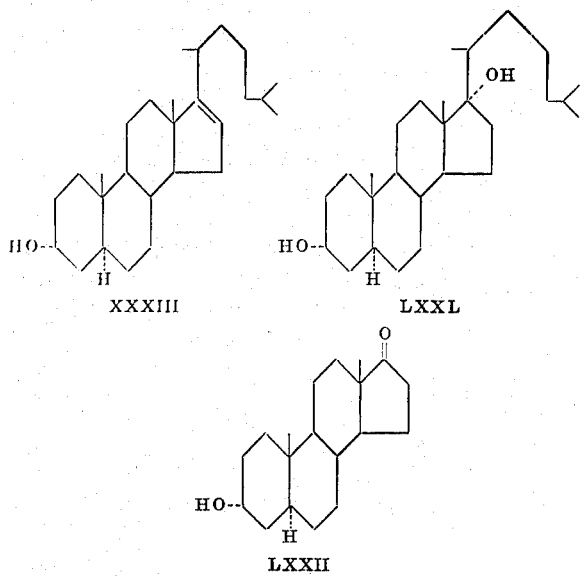

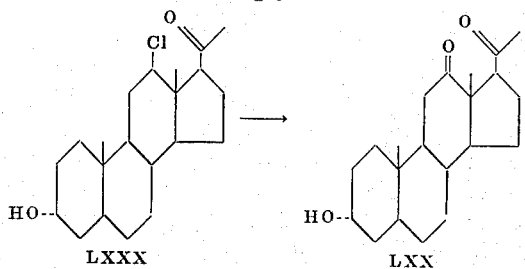

5α-Pregnane-3α-ol-12,20-dione (LXX) (compound (XIIIb) where Q is acetyl) may be converted to the mono-ketal (LXXI) by heating for 3 hrs with one equivalent of ethylene glycol in 10 parts by weight of benzene with 3 percent by weight of p-toluenesulfonic acid in an apparatus equipped with a Dean Stark water trap, followed by standard work up. This is converted to 11-keto derivative (LXXII) by the standard method of Gallagher (L.Fieser and M.Fieser "Steroids," Reinhold Publishing Co., New York, 1959,p.640), and this is converted to 11-ketoprogesterone (LXXIII) by a sequence analogous to that used above in the conversion (XLIX) to (LI) 11-ketoprogesterone has been converted (J.A.Hogg et al., J.Am.Chem.Soc.,77,4436 (1955), to cortisol acetate.

5α, 12-Chloropregnane-3α-ol-20-one (LXXX) (Compound (VII) where Q is acetyl) may be converted to (LXX) via its tetrahydropyranyl ether, displacement with NaOAc and oxidation, and deblocking of the 3-hydroxyl group.

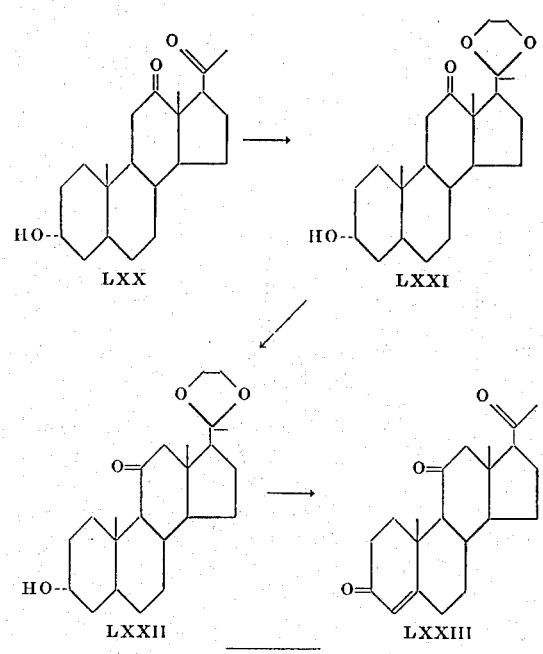

EXAMPLE 1

5α-cholestan-3α-yl p-benzoylbenzoate

To a solution of 1.83g (.1 mM) of p-benzoyl-benzoic acid in 50 ml reagent benzene was added 13.1 ml (20.6g; 16.2mm) oxalyl chloride and the resulting solution stirred at 55° C for 2 hrs. The solvent and excess oxalyl chloride were removed on a rotary evaporator, whereupon the residue was dissolved in 150ml dry benzene. To this was added 2.80 g (7.3mm) 5α-cholestan-3α-ol (I) and 8ml dry pyridine. The resulting solution was stirred at 60° C for 3 hrs. and then diluted with 100 ml ether and washed successively with 10 percent hydrochloric acid, saturated sodium bicarbonate solution, and brine. Drying (Mg $SO_4$) and concentration afforded 4.30 (99 percent) of a clear viscous oil which was passed through a column of 300g silica gel. Elution with 25 percent ether in cyclohexane produced 4.10g clear oil, homogeneous by thin layer chromatography (TLC) which was suitable for photolysis. I.R. ($CHCl_3$) $\nu$ : 1710 (ester C=O), 1670 (benzophenone C=O) $cm^{-1}$; nmr ($CDCl_3$) $\delta$ : 0.65(s,3, C—18—$CH_3$), 5.05 (m, 1, 3β-H), 7.3–8.3 (m,9,aromatic); mass spectrum (75 ev) m/e 596.

In accordance with the above procedure there were also obtained the 5α-cholestan-3α-yl esters of the following acids, wherein the named acids were used in place of p-benzoylbenzoic acid.

(II,n=o,m) m-benzoylbenzoic acid, (m/e=596);

(II,n=1,p) p-benzoylphenylacetic acid, (m/e=610);

(II,n=1,m) m-benzoylphenylacetic acid, (m/e=610);

(II,n=2,p) p-benzoyl-ω-phenylpropionic acid (m/e = 624);

(II, n = 3,p)p-benzoyl-ω-phenylbutyric acid (m/e = 638);

(II, n = 4,p)p-benzoyl-ω-phenylvaleric acid (m/e = 652);

(II,n = 5,p)p-benzoyl-ω-phenylcaproic acid (m/e = 66).

Each of these esters was homogeneous by T.L.C. and possessed the expected spectral properties as well as the necessary parent peak in its mass spectrum.

In accordance with the above procedure but where, in place of 5α-cholestan-3α-ol there is utilized 5α-pregnan-3α-ol, 5α-pregnan-20-oxo-3α-ol,and 17α-methoxy 5α-androstan-3α-ol, there are obtained the corresponding 5α-pregnan-3α-yl, 5α-pregnan-20-oxo-3α-yl and 17α-methoxy -5α-androstan-3α-yl benzoylphenylalkanoates.

EXAMPLE 2

12-Chloro-5α-Cholestan-3α-ol.-

A. Photolysis of 5α-cholestan-3α-yl ester (III (Q is 2,6-dimethylheptyl); n=o,p-) of p-Benzoylbenzoic acid.-

A solution of 297mg (0.50mm) ester in 575ml carbon tetrachloride (spectral grade) was degassed with a stream of nitrogen for 2 hrs. and then irradiated (Hanovia 450 watt medium pressure lamp) through a uranium glass filter sleeve for 3.7hrs. Concentration afforded 467mg yellow foam which contained no 1670cm$^{-1}$ carbonyl (benzophenone) in the infra red spectrum.

EXAMPLE 3

A. Photolysis of, 5α-cholestan-3α-yl ester of p-benzoyl-ω-phenylpropionic acid (III,n=2,p).

A solution of 793mg (1.27 mm) of ester III (n=2,p Q=2,6-dimethylheptyl) in 900ml carbon tetrachloride (freshly distilled from phosphorus pentoxide) was degassed for 12 hrs with a stream of argon and then irradiated (Hanovia 450 watt medium pressure lamp) through a uranium glass filter for 6 hours. Concentration afforded 1.11g of a yellow foam which had only a trace amount of 1670cm$^{-1}$ absorption (benzophenone carbonyl) in the I.R.

B. Hydrolysis of crude photoproduct.

A solution of the above crude photoproduct (1.11g) in 100ml methanol, 5ml water, 25ml 1,4-dioxane, and 8g potassium hydroxide was heated at reflux under a nitrogen atomosphere for 1.5hrs. Upon cooling the reaction mixture was diluted with water and extracted 3 times with ether. The aqueous layer was acidified to pH=1 with hydrochloric acid and then extracted with ether, dried (MgSO$_4$), and concentrated to yield 342mg yellow oil which possessed infra red absorption at 1670cm$^{-1}$ (benzophenone carbonyl) as well as the characteristic acid absorptions (1700cm$^{-1}$, acid carbonyl).

The ethereal extracts from above (neutral product) were washed with water and brine, dried (MgSO$_4$), and concentrated to yield 748 mg light foam which possessed considerable ester carbonyl absorption (1730cm$^{-1}$) in the infra red spectrum. This material was chromatographed on 74g silica gel. Elution with 10 percent ether in cyclohexane produced first 277mg lactone B. Hydrolysis of crude photoproduct from (III, n=o,P).

A solution of the above photoproduct (467 mg) in 35 ml methanol, 2 ml water, 5ml 1,4-dioxane, and 5g Potassium hydroxide was heated at reflux for 1hr. The solution was cooled, diluted with water, and extracted with ether. The organic extracts were washed with water and brine, dried (MgSO$_4$), and concentrated to yield 204mg yellow solid which by mass spectral analysis showed the presence of 12-chloro5α-cholestan-3-α-ol (m/e 422,424).

In accordance with the above procedures, but substituting for the 5α-cholestan-3α-yl ester of p-benzoylbenzoic acid (III,n=o,P) the 5α-cholestan-3α-yl esters of m-benzoylbenzoic acid (II,n=o,m),m-benzoyl-phenylacetic acid (II,n=1,m), and p-benzoylphenylacetic acid (II, n=1,P), the photolysis-hydrolysis procedure produced alcoholic material of the same approximate composition.

In accordance with the above procedure, but where in place of 5α-cholestan-3α-yl p-benzoylbenzoate there is utilized 5α-pregnan-3α-yl p-benzoylbenzoate, 5α-pregnan-20-oxo-3α-yl p-benzoylbenzoate or 17-methoxy-5α-androstan-3α-yl p-benzoylbenzoate, there is obtained 12-chloro-5α-pregnan-3α-ol, 12-chloro-5α-pregnan-20-oxo-3α-ol and 12-chloro-17-methoxy-5α-androstan-3α-ol.

In accordance with the above procedure but where in place of the p-benzoylbenzoates there are utilized the corresponding m-benzoylbenzoates, m-benzoylphenyl-acetates or p-benzoylphenylacetates the same products are obtained. (IV,VI,n=2) (35 percent from starting ester). ir(CHCl$_3$) 1730cm$^{-1}$(ester carbonyl);nmr (CDCl$_3$) δ 4.70(broad, 1,3α-H); mass spectrum (75 ev) m/e=624.

Further elution with 10 percent ether in cyclohexane afforded 380mg of 3α-hydroxy-12-chloro-5α-cholestane (VII).

C. Lithium Aluminum Hydride Reduction of Lactone Product (IV,VI,n=2).

A mixture of 264mg (0.42mm) lactone (IV,VII; n=2) and excess lithium aluminum hydride in 35ml ether was heated at reflux under an argon atmosphere for 3.5hrs. The excess reducing agent was destroyed with saturated sodium sulfate solution and the resulting solid removed by filtration and washed several times with ether. The filtrate was concentrated to afford 269mg viscous triol (X and IX) which contained strong –OH absorption in the infra red spectrum and no carbonyl bands. uv (CH$_3$CN) ε$_{262nm}$=1610.

D. Acetylation of Triol (IX,X);n=2).

A solution of the above triol (269mg) in 10ml dry pyridine and 2ml acetic anhydride was allowed to stand in a stoppered flask at room temperature for 16hrs. Concentration in vacuo afforded 281mg diacetate of (IX;X) (n=2) as an oil. ir (CHCl$_3$) 1735 (ester carbonyl)cm$^{-1}$; nmr(CDCl$_3$) δ 1.95 (S,6,acetyl CH$_3$); uv (CH$_3$CN) ε$_{262nm}$=1,600.

E. Dehydration of Diacetyl derivatives of (X) and (IX); (n=2)

To a solution 281mg of diacetate of (IX), (X); (n=2) in 15ml dry pyridine cooled to −15° C under a nitrogen atmosphere was added by syringe 0.5ml thionyl chloride (≈15 equivalents). After stirring for 10 min. the reaction mixture was poured into ice and then extracted with ether. The combined ether extracts were washed with dilute hydrochloric acid and brine, dried (MgSO$_4$), and concentrated to afford 307mg yellow diphenyl ethylene (XI; n=2) . UV (CH$_3$CN) ε$_{262nm}$= 6,700, and unchanged diacetate (XII).

F. Cleavage of Diphenyl Ethylene (XI;n=2) with Ruthenium Tetroxide – Sodium meta-Periodate.

The crude olefin (307mg) including the diacetate (XII) from above was dissolved in 20ml acetone and 3ml (0.099mM) of a 0.33mM/ml solution of ruthenium tetroxide in carbon tetrachloride was added. To this was added 300mg (14.mM) sodium periodate in 6ml water. After 20 min. stirring at room temperature the solution had turned dark and 300mg additional sodium periodate was added. This was repeated after 3hrs. and 7.5hrs. [total of 1.2g(5.5mM) sodium periodate added]. After 12hrs. the excess oxidant was destroyed by the addition of 3ml isopropyl alcohol, and the precipitate removed by filtration and washed copiously with acetone. The filtrate was diluted with 150ml water and extracted with three 50ml portions of ether and two 100ml portions of methylene chloride. The combined organic layers were washed with saturated sodium bicarbonate and brine, dried (MgSO$_4$), and concentrated to yield 173mg oil which had the desired 1710cm$^{-1}$ ketone absorption in the infra red spectrum. The crude product was chromatographed on 20g silica gel. Elution with 10 percent ether in cyclohexane afforded 31mg 5α-cholestan-3α-yl-12-one acetate (XIIIa) ir (CHCl₃) 1730 (ester carbonyl), 1710 (ketone carbonyl) cm⁻¹; nmr (CDCl₃) δ 1.03 (2,3,C–18 CH₃), δ (s,3, acetate), δ 4.05 (m,1,3α H);mass spectrum (75 ev) m/e 444. Further elution with ether yields the diacetate (XII)

G. 5α-cholestan-3α-ol-12-one (XIIIb)

A solution of 31mg of acetate (XIIIa) in 1ml methanol containing 100mg potassium hydroxide was heated at reflux under a nitrogen atmosphere for 40 min. The reaction mixture was cooled, diluted with water and extracted with ether. Drying (MgSO₄) and contration afforded 27mg keto alcohol(XIIIb)mp 161–5°the analytical sample of 5α-cholestan-3α-ol-12-c IIIb), mp 165–7°. IR(CHCl₃) 3600,3450 (–OH), 1710 (ketone) cm⁻¹; nmr (CDCl₃) δ 1.04 (s,3,C–18 CH₃); δ 4.0(m,1, 3αH, w ½ 8 cps); mass spectrum (75 ev) m/e 402.

Anal: calcd For C₂₇H₄₈O₂: C, 80.54; H, 11.51. Found: C, 80:61; H, 11.40.

H. 12-Chloro-5α-cholestan-3α-ol(VII)

The alcoholic material (380mg) from chromatography in part B, this experiment was rechromatographed on 30g Woelm neutral III alumina. Elution with 10 percent etherhexane afforded 147mg of (VII) as a white solid which by mass spectral analysis contained a single chlorine atom (m/e=422,424).

In accordance with the above procedure, but where in place of 5α-cholestan-3α-yl p-benzoyl-ω-phenyl propionate, there is utilized 5α-pregnan-3α-yl p-benzoyl-ω-phenylpropionate,5α-pregnan-20-oxo-3α-yl p-benzoyl-ω-phenyl propionate or 17α-methoxy-5α-androstan-3α-yl p-benzoyl-ω-phenylpropionate there is obtained 5α-pregnan-12-oxo-3α-ol and 12-chloro-5α-pregnan-3α-ol. 5α-pregnan-12,20-dioxo -3α-ol and 12-chloro-5α-prenan-20-oxo-3α-ol, and 17α-methoxy-5α-androstan-12-oxo-3α-ol and 12-chloro-17α-methoxy-5α-androstan-3α-ol respectively. There is also obtained in each case the corresponding diacetate of general formula (XII).

EXAMPLE 4

A. Photolysis of the 5α-cholestan-3α-yl Ester of p-Benzoyl-ω-phenylpropionic Acid (III,n=2,p)

A solution of 729mg (1.17mM) ester (III, Q is 2,6-dimethylheptyl, n=2,p) in 900mg spectral grade acetonitrile was degassed with a stream of argon for 3hrs. and then irradiated (Hanovia 450 watt medium pressure lamp) through a uranium glass filter sleeve for 4 hrs. concentration yielded 735mg clear foam which exhibited no 1670cm⁻¹ (benzophenone carbonyl) absorption in the infra red spectrum. This material was chromatographed on 55g silica gel. Elution with 10 percent ether-hexane afforded 405mg 55 percent lactonic material (VI) (1735cm⁻¹ ester carbonyl; 470 multiplet for 3α–H).

B. Lead tetraacetate Oxidation of Lactone (VI)

567mg (1.30mM) of lead tetraacetate (vacuum dried) were heated for 0.5 hrs. at reflux with 400mg calcium carbonate in 35ml dry benzene. To this was added 405mg (0.65mM) lactone (VI) in 10 ml dry benzene and the resulting mixture heated at reflux for 9 hrs. Upon cooling the reaction mixture was diluted with ether and extracted successively with 10 percent hydrochloric acid, water, and brine, dried (MgSO₄), and concentrated to yield 379mg light yellow foam (compounds XXI and XXII) which had strong 1670cm⁻¹ (benzophenone carbonyl) absorption in its infra red spectrum.

C. Hydrolysis of Oxidation Product

A solution of 379mg oil from part B (compounds XXI and XXII) in 35ml methanol, 5ml, 14-dioxane, 1ml water, and 5g potassium hydroxide was heated at reflux for 1 hr. The reaction mixture was cooled, diluted with water, and extracted with ether. The combined organic layers were washed with water and brine, dried (MgSO₄), and concentrated to give 221mg oily solid which contained only trace aromatic proton absorption in its nmr spectrum. This material was separated into component parts by thick layer chromatography on silver nitrate impregnated silca gel plates (20 percent silver nitrate/silica gel), eluting twice with 10 percent ether-chloroform. The slowest moving material (20mg, 8%) mp. 141–5°, after recrystalization from methanol, was 5α-cholest-8(14)-en-3α-ol (XVb). ir (CHCl₃) 3600, 3450 (–OH) cm⁻¹; nmr (CDCl₃) δ 0.70 (s,3,c–19 CH₃), δ 4.05(m1,C–2α H, w ½ 8cps).

Oxidation of the 3α alcohol with Jones' reagent and reduction with lithium aluminum tritertiarybutoxy hydride afforded material, mp 118–21°, that was identical to the known 5α-cholest-8(14)-en-3β-ol, mp 120-121,mixed mp 118–121°.

The next fastest moving component (67mg, 27 percent) mp 165–7°, after recrystalization from ethanol, was 5α-cholest-14-en-3α-ol(XIVb) ir (CHCl₃) 3600, 3450 (–OH)cm⁻¹;nmr (CDCl₃) δ 0.81(s,3,C–19 CH₃); δ 4.04(m,1,C–3αH,w ½ 8 cps); δ 5.17 (m,1,C–15 H,w ½ 7.5 cps). Oxidation of this material with Jones' reagent and reduction with lithium aluminum tri-tertiary butoxy hydride yielded white solid, mp 130–1° that was identical to an authentic sample (6) of 5α-cholest-14-en-3α-ol mp 129–31; mixed mp 129–30°.

In accordance with the above procedure, but where in place of 5α-cholestan-3α-yl p-benzoyl-ω-phenyl propionate, there is utilized 5α-pregnan-3α-yl p-benzoyl-ω-phenylpropionate, 5α-pregnan-20-oxo-3α-yl p-benzoyl-ω-phenylpropionate or 17α-methoxy-5α-androstan-3α-yl p-benzoyl-ω-phenylpropionate there is obtained 5α-pregn-8(14)-en-3α-ol and 5α-pregn-14-en-3α-ol and 5α-pregn-14-en 3α-ol, 5α-pregn-8(–)-en-20-oxo-3α-ol and 5α-pregn-14-en-20-oxo-3α-ol, and 17α-methoxy-5α-androst-8(14)-en-3α-ol and -17α-methoxy-5α-androst-14-en-3α-ol respectively.

EXAMPLE 5

A. Photolysis of the 5α-cholestan-3α-yl Ester (III, n=2,p) of p-Benzoyl-ω-phenylpropionic acid in Benzene.

A solution of 749mg (1.20mM) ester (III,Q is 2,6-dimethylheptyl,n=2, p) in 900ml spectral grade benzene was degassed with a stream of argon for 2hrs. and then irradiated (Hanovia 450 watt medium pressure lamp) through a uranium glass filter sleeve for 1.3hrs. Concentration afforded 758mg white foam exhibiting no benzophenone carbonyl absorption in its infra red spectrum.

B. Hydrolysis of Crude, Photoproduct

A solution of the above foam in 200ml methanol, 50ml 1,4-dioxane, 110ml water and 15g potassium hydroxide were heated at reflux for 1hr. and then cooled and diluted with water and extracted with ether. The combined organic extracts were washed with water and brine, dried ($MgSO_4$) and concentrated to afford 524mg oil oil. analysis (ratio of C-15 H to some of this materials 3α H's in ester and alcohol) indicated that approximately 35 percent of 5α-cholest-14-en-3α-ol(XIVb) was present. The crude product was separated into a lactonic (164mg) portion and alcoholic (345mg) portion by chromatography on silica gel. Further chromatography on silver nitrate impregnated silica gel afforded pure 5α-cholest-14-en-3α-ol(XIVb), mp 141–3°, identical to that derived from lead tetraacetate oxidation of lactone(VI) ($n=2,p$).

In accordance with the above procedure, but where in place of 5α-cholestan-3α-yl p-benzoyl-ω-phenyl propionate, there is utilized 5α-pregnan-3α-yl p-benzoyl-ω-phenylpropionate, 5α-pregnan-20-oxo-3α-yl p-benzoyl-ω-phenylpropionate or 17α-methoxy-5α-androstan-3α-yl-p-benzoyl-ω-phenylpropionate there is obtained 5α-pregn-14-en-3α-ol; 5α-pregn-14-en-20-oxo-3α-ol, and 17α-methoxy-5α-androst-14-en-3α-ol respectively.

EXAMPLE 6

A. Photolysis of the 5α-Cholestan-3α-yl Ester of p-Benzoyl-ω-phenylvaleric Acid(III,$n=4$,p) in Benzene.

A solution of 1.311g ester (2.01mM) (III,Q is 2,6-dimethylheptyl; $n=4$,p) in 1900ml benzene (stirred over sulfuric acid and freshly distilled from phosphorus pentoxide) was degassed in a stream of argon for 2 hrs. and then irradiated (Hanovia 450 watt medium pressure lamp) through a uranium glass filter sleeve until the benzophenone carbonyl had disappeared (1.5hrs). Concentration afforded 1.302g white foam.

B. Hydrolysis of Crude Photoproduct

A solution of the above foam (1.302g) in 70ml $CH_3OH$, 10ml 1,4-dioxane, 2ml water, and 5g potassium hydroxide was heated at reflux for 1 hr. and then cooled, diluted with water, and extracted with ether. The organic extracts were washed with water and brine, dried ($MgSO_4$), and concentrated to yield 809mg white solid which was chromatographed on 70g silver nitrate impregnated silica gel (20 percent silver nitrate). Elution with 40 percent ether/hexane eluted 85mg (10 percent) of pure 5α-cholestan-3α-ol, followed by 279mg (36 percent) of 5α-cholest-16-en-3α-ol. (XXXIII) mp 133–6°, ir ($CHCl_3$) 3600,3450 (–OH)cm⁻; nmr ($CDCl_3$) δ 0.79 (s,3,C–18 or 19 $CH_3$), δ 0.82 (C–18 or C+19 $CH_3$), δ 4.05 (m.1,3α–H, w ½ 8 cps), 5.30 (m,1,16–H, w ½ 5cps); mass spectrum (75 ev) m/e 386. Next eluted was 136mg (17 percent) of 5α-cholestan-14-en-3α-ol(XIVb), identical with that obtained in earlier experiments.

In accordance with the above procedure, but where in place of 5α Cholestan-3α-yl p-benzoyl-ω-phenyl-valerate, there is utilized 5α-pregnan-3α-yl p-benzoyl-ω-phenylvalerate, 5α-pregnan-20-oxo-3α-yl p-benzoyl-ω-phenyl-valerate or 17α-methoxy-5α-androstan-3α-yl p-benzoyl-ω-phenylvalerate there is obtained 5α-pregn-16-en-3α-ol-and 5α-pregn-14-en-3α-ol, 5α-pregn-16-en-20-dioxo-3α-ol and-5α-pregn-14-en-20-oxo-3α-ol, and 17α-methoxy-5α-androst-16-en-3α-ol and -17α-methoxy-5α-androst-14-en-3α-ol respectively.

EXAMPLE 7

ANDROSTERONE.

A. Photolysis of the 17 methoxy-5α-androstan-3α-yl Ester of p-Benzoyl-ω-phenylvaleric Acid (III,$n=4$).

A solution of 234 mg (0.40 mM) (III,$n=4$,p-, Q is methoxy) ester, in 440ml benzene (freshly distilled from phosphorus pentoxide was degassed in a stream of argon for 18hrs. and then irradiated (Hanovia 450 watt medium pressure lamp) through a uranium glass filter until the benzophenone carbonyl disappeared (1.8hrs.). Concentration yielded 241mg white foam.

B. Base Hydrolysis of Crude Photoproduct

A solution of the crude photoproduct (241mg) in 35ml methanol, 2ml water, 5ml 1,4-dioxane, and 3.5g potassium hydroxide was heated at reflux for 1 hr. and then cooled, diluted with water, and extracted with ether. The organic extracts were washed with water and brine, dried ($MgSO_4$) and concentrated to afford 119mg oily solid.

C. Acid Hydrolysis

A solution of the above alcohol (119mg) in 10ml acetone and 5ml 10 percent hydrochloric acid was allowed to stand at room temperature for 10 hrs. and then diluted with water and extracted with ether. The ether extracts were washed with saturated sodium bicarbonate solution and brine, dried ($MgSO_4$), and concentrated to yield a white oily solid which crystalized from acetone to give androsterone, mp 175–7°, identical with an authentic sample of androsterone, mp 177 14 9°.

In accordance with the above procedure, but where, in place of 17-methoxy-5α-androstan-3α-yl p-benzoyl-ω-phenylvalerate, there is utilized 17-phenoxy-5α-androstan-3α-yl p-benzoyl-ω-phenylvalerate, 17-benzoxy-5α-androstan-3α-yl p-benzoyl-ω-phenylvalerate or 17-toloxy-5α-androstan-3α-yl p-benzoyl-ω-phenylvalerate, there is also obtained androsterone.

PREPARATION OF THE BENZOPHENONE ACIDS 1. p-Benzoylbenzoic Acid (II,$n=o$,p) commercially available.
2. m-Benzoylbenzoic Acid (II,$n=o,m$) (M.S.Newman and N.C.Deno J.Am.Chem.Soc.,73, 3651 (1951))
3. p-Benzoylphenylacetic Acid (II,N=1, p) (J.A.Zderic, M.J.Kubitschek, and W.A.Bonner J.Org.Chem., 26, 1635 (1961))
4. m-Benzoylphenylacetic Acid (II,$n=1,m$) (prepared by the method of Zderic et al, supra)
5. P-Benzoyl-ω-phenylpropionic acid (II, $n=2,p$) (W.Borsche and F.Sinn Ann., 553,260 (1942))
6. p-Benzoyl-ω-phenylbutyric Acid (II,$n=3$,p) (prepared by method of Borsche et al supra.)
7. p-Benzoyl-ω-phenylvaleric Acid (II,$n=4$,p) mp.55–8°(prepared by method of Borsche et al, supra)
8. p-Benzoyl-ω-phenylcaproic Acid (II,$n=5$,p) (prepared by method of Borsche et.al, supra)
9. p-Benzoyl-ω-phenylpelorgonic Acid (II,$n=8$,p) mp 67–8° (prepared by method of Borsche et al. supra)

What is claimed is:

1. A method of activating the unactivated methylene groups, at C–12,C–14 or C–16 in a steroid molecule of the 5α-pregnane, 5α-androstane or 5α-cholestane series which comprises the steps of:

a. reacting a 3α-hydroxy steriod of the 5α-pregnane, 5α-androstane or 5α-cholestane series, wherein carbon atoms 12 and 16 of said steriods carry two hydrogen atoms each and carbon atoms 8 and 14 of said steriods carry one hydrogen atom each, with a m-o-p-benzoylphenylalkanoic acid, -anhydride, or -acid halide wherein the alkanoyl moiety contains between one and five carbon atoms, b. irradiating said ester with ultraviolet light, in a solvent selected from hydrocarbon and halo hydrocarbon solvents, and c. saponifying the ester, whereby there is produced the appropriate 12-halo, 12-carbinol, $\alpha^{8(14)}$, $\alpha^{14}$ or $\alpha^{16}$ steroid.

2. In a process of claim 1, the steps which comprise:

a. reacting a compound selected from the groups consisting of

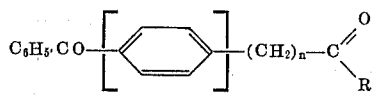

wherein the position of the alkanoyl group

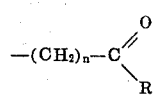

on the phenyl nucleus is meta-or para- to the benzoyl substituent thereon, where R is hydroxyl, halo or

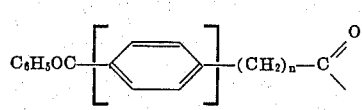

and $n$ is O or an integer from 1–4, with a compound selected from the group having the general formula

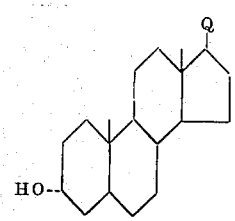

wherein Q is 2,6-dimethylheptyl, ethyl, acetyl, alkoxy, aroxy, alkaroxy and aralkoxy, and b. subjecting the ester thus produced to ultraviolet irradiation.

3. A process of claim 2 where in the irradiation is carried out in a solvent selected from the group consisting of methylene chloride, carbon tetrachloride, benzene, acetone, and acetonitrile.

4. A process of claim 2 wherein the solvent is carbon tetrachloride, $n=1$ where the substitution is m=, and $n=0$ or 2 where the sutstution is p=.

5. A process of claim 4 wherein $n=2$ additionally comprising the steps of i. reacting the irradiation product with a mild base,
ii. separating the lactone component from the alcohol component produced by the previous step,
iii. sequentially lactone the lactone component with
  a. a reducing agent,
  b. an acylating agent,
  C. a dehydrating agent,
  d. an oxydizing agent, and
  e. a saponifying agent.

6. A process of claim 5 wherein:

a. the reducing agent is lithium aluminum hydride, b. the acylating agent is acetic anhydride in pyridine,
c. the dehydrating agent is thionyl chloride in pyridine,
d. the oxydizing agent is ruthenium tetroxide with sodium periodate, and
e. the saponifying agent is potassium hydroxide in methanol, whereby there if formed a compound of general formula:

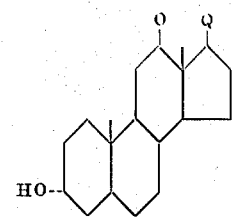

7. A process of claim 6 wherein Q is 2,6-dimethylheptyl.

8. In a process of claim 5, the additional step which comprises chromatographically separating from the lactone component formed in step (i) whereby a compound of the general formula

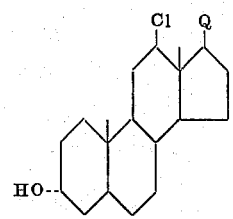

is produced.

9. A process of claim 8 wherein Q is 2,6-dimethylheptyl.

10. A process of claim 8 when Q is acetyl.

11. A process of claim 8 wherein Q is ethyl.

12. A process of claim 8 wherein Q is alkoxy, aroxy, or alkaroxy.

13. A process of claim 2 wherein the solvent is acetone, benzene or acetonitrile, $n=2$ and the alkanoyl substitution is p-, additionally comprising the steps of treating the irradiation product sequentially with;

a. an oxidizing agent,
b. a saponifying agent.

14. A process of claim 13 wherein:

a. the oxidizing agent is lead tetracetate in the presence of benzene and calcium carbonate,
b. the saponifying agent is alkali in an alkanol whereby there is produced a mixture of compounds of the formula

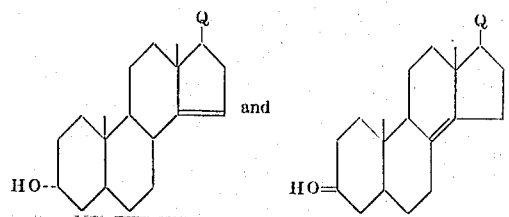

wherein Q has the same value in both compounds.

15. A process of claim 14 wherein Q is 2,6-dimethylheptyl.

16. A process of claim 14 wherein Q is acetyl.

17. A process of claim 14 wherein Q is ethyl.

18. A process of claim 14 wherein Q is -O R when R is an alkoxy, aroxy aralkoxy or alkaroxy.

19. A process of claim 2 wherein the solvent is acetone, benzene or acetonitrile, n=4 and the substitution is p-, additionally comprising the steps of treating the irradiation product sequentially with a. lead tetraacetate in the presence of benzene and calcium carbonate, and b. an alkali in an alkanol, whereby there are produced compounds of the formula

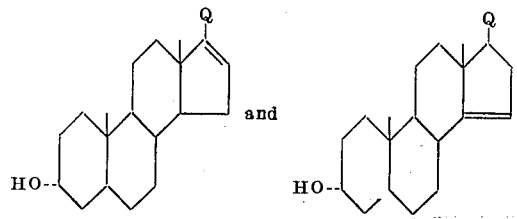

20. A process of claim 19 wherein Q is 2,6-dimethylheptyl.

21. A process of claim 19 wherein Q is acetyl.

22. A process of claim 19 wherein Q is ethyl.

23. A process of claim 19 wherein Q is -O R when R is an alkyl, aryl, aralkyl or alkaryl group.

24. A compound of the formula

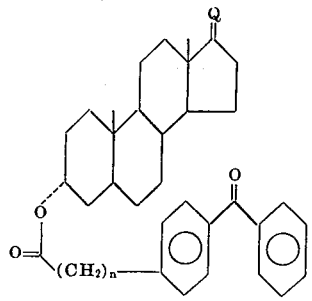

where Q is 2,6dimethylheptyl, acetyl, aroxy, alkoxy, aralkoxy, alkanoxy, and $n$ is O or 1-4. Wherein the alkanoyl moiety is substituted mata- or para- to the carbonyl of the benzoyl moiety.

25. A compound of the formula

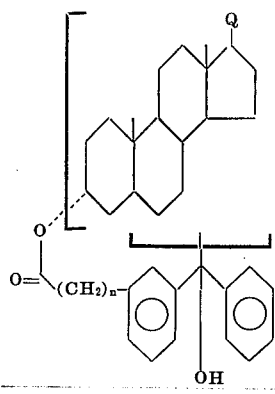

wherein Q is as in claim 24, $n$ is 2 or 4 and a carbon-carbon single bond links the carbon bearing the tertiary hydroxy group on the ester moiety to the 12, 14, or 16 position of the steroid nucleus.

* * * * *